United States Patent
Lovlekar et al.

(10) Patent No.: US 12,477,608 B2
(45) Date of Patent: Nov. 18, 2025

(54) SYNCHRONIZATION OF RRC STATUS OF A MULTI-SIM USER EQUIPMENT WITH A BASE STATION

(71) Applicant: Apple Inc., Cupertino, CA (US)

(72) Inventors: Srirang A. Lovlekar, Fremont, CA (US); Adesh Kumar, San Jose, CA (US); Birgit Breining, Munich (DE); Dawei Zhang, Saratoga, CA (US); Fangli Xu, Beijing (CN); Haijing Hu, Los Gatos, CA (US); Longda Xing, San Jose, CA (US); Naveen Kumar R. Palle Venkata, San Diego, CA (US); Sethuraman Gurumoorthy, San Ramon, CA (US); Yuqin Chen, Beijing (CN); Zhibin Wu, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 867 days.

(21) Appl. No.: 17/593,722

(22) PCT Filed: Oct. 22, 2020

(86) PCT No.: PCT/CN2020/122971
§ 371 (c)(1),
(2) Date: Sep. 23, 2021

(87) PCT Pub. No.: WO2022/082650
PCT Pub. Date: Apr. 28, 2022

(65) Prior Publication Data
US 2022/0312531 A1    Sep. 29, 2022

(51) Int. Cl.
*H04W 72/04*     (2023.01)
*H04W 8/18*      (2009.01)
(Continued)

(52) U.S. Cl.
CPC ........... *H04W 76/19* (2018.02); *H04W 8/183* (2013.01); *H04W 76/20* (2018.02); *H04W 76/30* (2018.02)

(58) Field of Classification Search
None
See application file for complete search history.

(56) References Cited

U.S. PATENT DOCUMENTS

| | | |
|---|---|---|
| 2014/0220981 A1 | 8/2014 | Jheng et al. |
| 2016/0142998 A1 | 5/2016 | Tsai et al. |

(Continued)

FOREIGN PATENT DOCUMENTS

| | | |
|---|---|---|
| CN | 111083752 | 4/2020 |
| CN | 111294986 | 6/2020 |
| WO | 2015/171246 | 11/2015 |
| WO | 2017/012532 | 1/2017 |

OTHER PUBLICATIONS

Apple, "UE Assisted RRC State Transition"; 3GPP TSG-RAN WG2 Meeting #106; R2-1907166; May 13, 2019, 3 sheets.
(Continued)

*Primary Examiner* — Willie J Daniel, Jr.
(74) *Attorney, Agent, or Firm* — Fay Kaplun & Marcin, LLP

(57) ABSTRACT

A multi-universal subscriber identity module (MUSIM) user equipment (UE) is configured to stay synchronized with a network. The UE registers to a first network for the first SIM, registering to a second network for the second SIM, prior to the UE conducting a high priority activity related to the second SIM, sends, to the first network via a connection associated with the first SIM, a first message comprising an estimated time duration during which the UE conducts the high priority activity related to the second SIM, receives, from the first network, a second message indicating a time period during which the first network will retain a connec-
(Continued)

tion context for the connection associated with the first SIM in an RRC Inactive state and when the UE completes the high priority activity, determines the connection context of the first network for the connection associated with the first SIM.

17 Claims, 11 Drawing Sheets

(51) Int. Cl.
  *H04W 76/19* (2018.01)
  *H04W 76/20* (2018.01)
  *H04W 76/30* (2018.01)

(56) References Cited

U.S. PATENT DOCUMENTS

| | | |
|---|---|---|
| 2018/0160422 A1 | 6/2018 | Pathak et al. |
| 2019/0053130 A1 | 2/2019 | Guo et al. |
| 2020/0275349 A1 | 8/2020 | Guo et al. |
| 2022/0312322 A1 | 9/2022 | Su et al. |

OTHER PUBLICATIONS

Intel Corporation, "Efficient RRC state transitions from RRC Connected to RRC_IDLE or to RRC Inactive"; 3GPP TSG RAN WG2 Meeting #105bis; R2-1904433; Mar. 29, 2019; 3 sheets.

Apple Inc., "Methods for Multi-SIM Network Switching"; 3GPP TSG-RAN WG2 Meeting #112e, R2-2009506, Oct. 23, 2020, 8 sheets.

SYNCHRONIZATION OF RRC STATUS OF A MULTI-SIM USER EQUIPMENT WITH A BASE STATION

BACKGROUND

In 5G new radio (NR) networks, a user equipment (UE) may be configured with multiple universal subscriber identity modules (SIMs) (e.g., two SIMs). In some cases, the UE may only include one receiver, in which case the UE is categorized as a single receiver dual SIM dual standby (SR-DSDS) UE. When the secondary SIM wishes to conduct communications with the network, the secondary SIM requests that the first SIM suspend its activities so that the second SIM may commence communications with a base station of the network.

SUMMARY

Some exemplary embodiments are related to a user equipment (UE) having a multi universal subscriber identity module (MUSIM) array having a first SIM and a second SIM, a transceiver configured to communicate with one or more networks and a processor communicatively coupled to the transceiver and configured to perform operations. The operations include registering to a first network for the first SIM, registering to a second network for the second SIM, prior to the UE conducting a high priority activity related to the second SIM, sending, to the first network via a connection associated with the first SIM, a first message comprising an estimated time duration during which the UE is to conduct the high priority activity related to the second SIM, receiving, from the first network, a second message indicating a time period during which the first network will retain a connection context for the connection associated with the first SIM in an RRC Inactive state and when the UE completes the high priority activity related to the second SIM, determining the connection context of the first network for the connection associated with the first SIM.

Other exemplary embodiments are related to a processor configured to perform operations. The operations include registering to a first network for the first SIM, registering to a second network for the second SIM, prior to the UE conducting a high priority activity related to the second SIM, sending, to the first network via a connection associated with the first SIM, a first message comprising an estimated time duration during which the UE is to conduct the high priority activity related to the second SIM, receiving, from the first network, a second message indicating a time period during which the first network will retain a connection context for the connection associated with the first SIM in an RRC Inactive state and when the UE completes the high priority activity related to the second SIM, determining a connection context of the first network for the connection associated with the first SIM.

Still further exemplary embodiments are related to a user equipment (UE) having a multi universal subscriber identity module (MUSIM) array having a first SIM and a second SIM, a transceiver configured to communicate with one or more networks and a processor communicatively coupled to the transceiver and configured to perform operations. The operations include registering to a first network for the first SIM, registering to a second network for the second SIM, performing, by the UE, a high priority activity via a connection associated with the second SIM, wherein, a connection associated with the first SIM is in a suspended state while the high priority activity is being performed via the connection associated with the second SIM, when the UE completes the high priority activity related to the second SIM, transmitting, to the first network via the connection associated with the first SIM, an RRC resume request including a cause value indicating rnaUpdate.

Additional exemplary embodiments are related to a user equipment (UE) having a multi universal subscriber identity module (MUSIM) array having a first SIM and a second SIM, a transceiver configured to communicate with one or more networks and a processor communicatively coupled to the transceiver and configured to perform operations. The operations include registering to a first network for the first SIM, registering to a second network for the second SIM and prior to the UE conducting a high priority activity related to the second SIM, transmitting, to the first network via a connection associated with the first SIM, an RRC resume request comprising an indication that the UE is requesting initiation of coordinated leaving related to the connection associated with the first SIM.

Further exemplary embodiments are related to a user equipment (UE) having a multi universal subscriber identity module (MUSIM) array having a first SIM and a second SIM, a transceiver configured to communicate with one or more networks and a processor communicatively coupled to the transceiver and configured to perform operations. The operations include registering to a first network for the first SIM, registering to a second network for the second SIM, transmitting, to the first network via a connection associated with the first SIM, an RRC resume request comprising a mobile-originated signaling IE indicating that a connection context for the connection associated with the first SIM should be transitioned to an RRC connected state, receiving, from the first network via the connection associated with the first SIM, an RRC resume message indicating that the connection associated with the first SIM should transition to the RRC connected state, transitioning the connection associated with the first SIM to the RRC connected state, transmitting, to the first network via the connection associated with the first SIM, a UE assistance information message comprising a preferred RRC state set to idle, receiving, from the first network via the connection associated with the first SIM, an RRC release message, transitioning the connection associated with the first SIM to an RRC Idle state, performing a high priority activity via a connection associated with the second SIM.

More exemplary embodiments are related to a base station having a transceiver configured to communicate with a user equipment (UE) having a multi universal subscriber identity module (MUSIM) array with a first SIM and a second SIM and a processor communicatively coupled to the transceiver and configured to perform operations. The operations include receiving a first message from the UE indicating an estimated time duration during which a connection associated with the first SIM will be in a suspended state and transmitting, to the UE via the connection associated with the first SIM, a second message indicating a time period during which the base station will retain a connection context for the connection associated with the first SIM in an RRC Inactive state.

DETAILED DESCRIPTION

Figure 1:
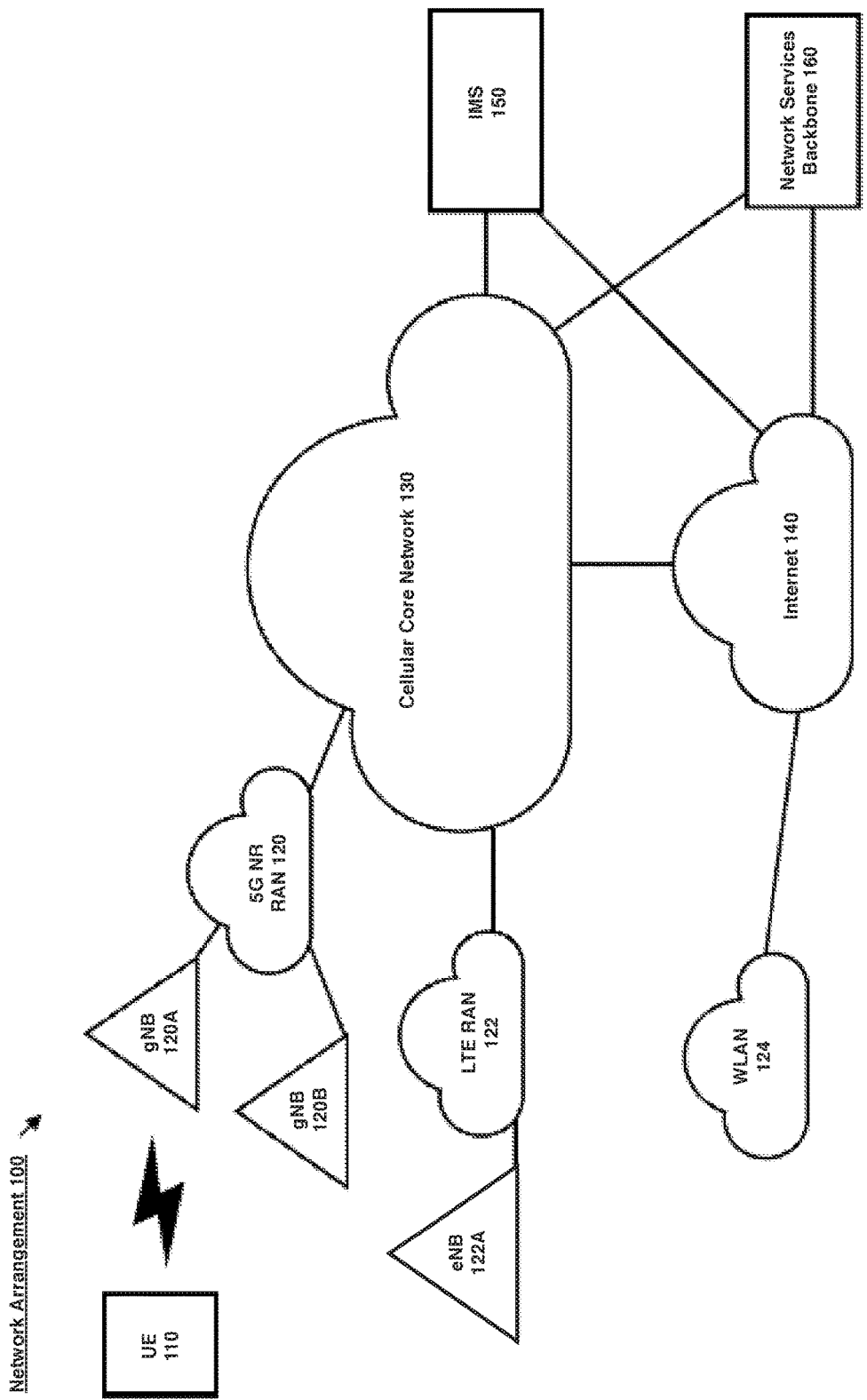
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments describe a device, system and method for a user equipment (UE) to synchronize a radio resource control (RRC) status of one of its subscriber identity modules (SIMs) with a base station of a 5G new radio (NR) wireless network.

The exemplary embodiments are described with regard to a network that includes 5G NR radio access technology (RAT). However, the exemplary embodiments may be implemented in other types of networks using the principles described herein.

Throughout this description reference is made to the SIMs of the performing a function (e.g., communicating with the wireless network). However, those skilled in the art will understand that the SIMs themselves do not perform any functions or operations. Rather, the UE, or more precisely a processor of the UE, implements one or more protocol stacks using the credentials and other information stored on the SIMs and then establishes a connection with networks using the one or more protocol stacks. Thus, when referring to a SIM communicating with a network, this should be understood to include the UE or the processor of the UE communicating via a connection associated with the SIM. Similarly, any other operation attributed to the SIM herein should be understood to be an operation being performed by a protocol stack implemented by the processor using the information provided by the SIM.

The exemplary embodiments are also described with regard to a UE. However, the use of a UE is merely for illustrative purposes. The exemplary embodiments may be utilized with any electronic component that may establish a connection with a network and is configured with the hardware, software, and/or firmware to exchange information and data with the network. Therefore, the UE as described herein is used to represent any electronic component.

When operating on a network cell, a UE may be configured to be in one of a plurality of different radio resource control (RRC) operating states (e.g., RRC connected state, RRC idle state, RRC inactive state, etc.). Those skilled in the art will understand that when the UE is in an RRC connected state, the UE and the network may be configured to exchange information and/or data. The exchange of information and/or data may allow the UE to perform functionalities available via the network connection. Further, those skilled in the art will understand that when the UE is in the RRC idle state, the UE is generally not exchanging data with the network and radio resources are not being assigned to the UE within the network. However, when the UE is in RRC idle state, the UE may monitor for information and/or data transmitted by the network (e.g., a TRS, a wake-up signal (WUS), paging, etc.).

Another operating state may be characterized as RRC inactive state. In RRC inactive state, the UE suspends the RRC connection while minimizing signaling and power consumption. Similar to RRC idle state, when the UE is in the RRC inactive state, the UE is generally not exchanging data with the network. When the UE is in RRC inactive state, the UE may still monitor for information and/or data transmitted by the network (e.g., TRS, WUS, paging, etc.).

As noted above, when a secondary SIM (SIM 2) of the UE wishes to conduct communications with the network, SIM 2 requests that a primary SIM (SIM 1) enter a suspended state so that SIM 2 may perform a high priority activity (e.g., a phone call, a video call, etc.) When SIM 1 suspends its activities, SIM 2 begins performing the activity. When the base station to which SIM 1 was connected sends out a periodic page to SIM 1, SIM 1 does not receive the page because it is in a suspended state. Because the base station has not received an acknowledgement that SIM 1 has received the page, the base station may transition SIM 1 to an RRC Idle state. The base station may also transition SIM 1 to an RRC Idle state due to a prolonged period of inactivity. After SIM 2 has completed its high priority activity, SIM 1 returns to its original state before SIM 2's request. Assuming the original state was an RRC Inactive state, SIM 1 enters an RRC Inactive state. However, because the network has transitioned SIM 1 to an RRC Idle state, there is a mismatch between SIM 1 and the network, which causes an unnecessarily long latency when SIM 1 subsequently tries to communicate with the network. In addition, the UE may waste unnecessary power by remaining in a shorter discontinuous reception (DRX) cycle associated with the RRC Inactive state when the UE could have been in the longer DRX cycle associated with the RRC Idle state.

According to some exemplary embodiments, a first SIM (SIM 1) of a single receiver—dual SIM dual standby (SR-DSDS) UE is configured to apprise a base station of the network that SIM 1 is entering a suspended state. Based on the capabilities of the base station, the base station will report the RRC status of SIM 1 at the network side so that both SIM 1 and the base station will have the same RRC status for SIM 1.

FIG. 1 shows an exemplary network arrangement 100 according to various exemplary embodiments. The exemplary network arrangement 100 includes a UE 110. It should be noted that any number of UEs may be used in the network arrangement 100. Those skilled in the art will understand that the UE 110 may alternatively be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network configuration 100, the networks with which the UE 110 may wirelessly communicate are a 5G New Radio (NR) radio access network (5G NR-RAN) 120, an LTE radio access network (LTE-RAN) 122 and a wireless local access network (WLAN) 124. However, it should be understood that the UE 110 may also communicate with other types of networks and the UE 110 may also communicate with networks over a wired connection. Therefore, the UE 110 may include a 5G NR chipset to communicate with the 5G NR-RAN 120, an LTE chipset to communicate with the LTE-RAN 122 and an ISM chipset to communicate with the WLAN 124.

The 5G NR-RAN 120 and the LTE-RAN 122 may be portions of cellular networks that may be deployed by cellular providers (e.g., Verizon, AT&T, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UE that are equipped with the appropriate cellular chip set. The WLAN 124 may include any type of wireless local area network (WiFi, Hot Spot, IEEE 802.11x networks, etc.).

The UE 110 may connect to the 5G NR-RAN 120 via the next generation Node B (gNB) 120A and/or the gNB 120B. During operation, the UE 110 may be within range of a plurality of gNBs. Thus, either simultaneously or alternatively, the UE 110 may connect to the 5G NR-RAN 120 via the gNBs 120A and 120B. Further, the UE 110 may communicate with the eNB 122A of the LTE-RAN 122 to transmit and receive control information used for downlink and/or uplink synchronization with respect to the 5G NR-RAN 120 connection.

Those skilled in the art will understand that any association procedure may be performed for the UE 110 to connect to the 5G NR-RAN 120. For example, as discussed above, the 5G NR-RAN 120 may be associated with a particular cellular provider where the UE 110 and/or the user thereof has a contract and credential information (e.g., stored on a SIM card). Upon detecting the presence of the 5G NR-RAN 120, the UE 110 may transmit the corresponding credential information to associate with the 5G NR-RAN 120. More specifically, the UE 110 may associate with a specific base station (e.g., the gNB 120A of the 5G NR-RAN 120).

In addition to the networks 120, 122 and 124 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network, e.g. the 5GC for NR. The cellular core network 130 also manages the traffic that flows between the cellular network and the Internet 140.

The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
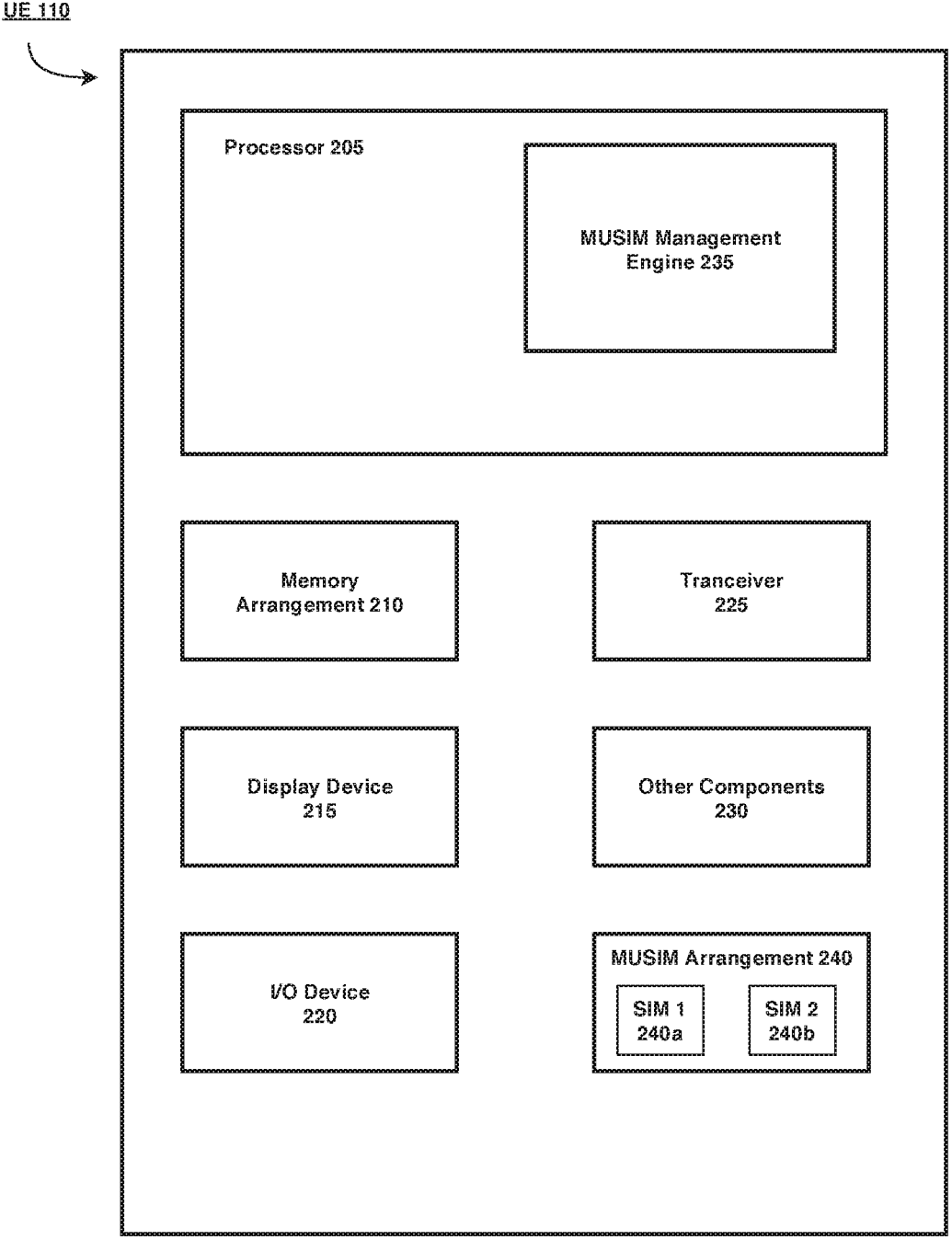
FIG. 2 shows an exemplary user equipment (UE) according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225, other components 230, and a multi-universal SIM (MUSIM) arrangement 240. The other components 230 may include, for example, an audio input device, an audio output device, a battery that provides a limited power supply, a data acquisition device, ports to electrically connect the UE 110 to other electronic devices, one or more antenna panels, etc. For example, the UE 110 may be coupled to an industrial device via one or more ports. The MUSIM arrangement 240 may include a first SIM (SIM 1) 240a and a second SIM (SIM 2) 240b, each of which may be coupled to different gNBs 120a, 120b of different networks.

The processor 205 may be configured to execute a plurality of engines of the UE 110. For example, the engines may include a MUSIM management engine 235. The MUSIM management engine 235 may perform various operations related to managing which of the multiple SIMs (e.g., SIM 1 240a, SIM 2 240b) may use the transceiver 225 at a given time and apprising the network of an RRC status of the SIM that has been suspended. Examples of this process will be described in greater detail below.

The above referenced engine being an application (e.g., a program) executed by the processor 205 is only exemplary. The functionality associated with the engine may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UE, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, the LTE-RAN 122, the WLAN 124, etc. Accordingly, the transceiver 225 may operate on a variety of different frequencies or channels (e.g., set of consecutive frequencies).

Figure 3:
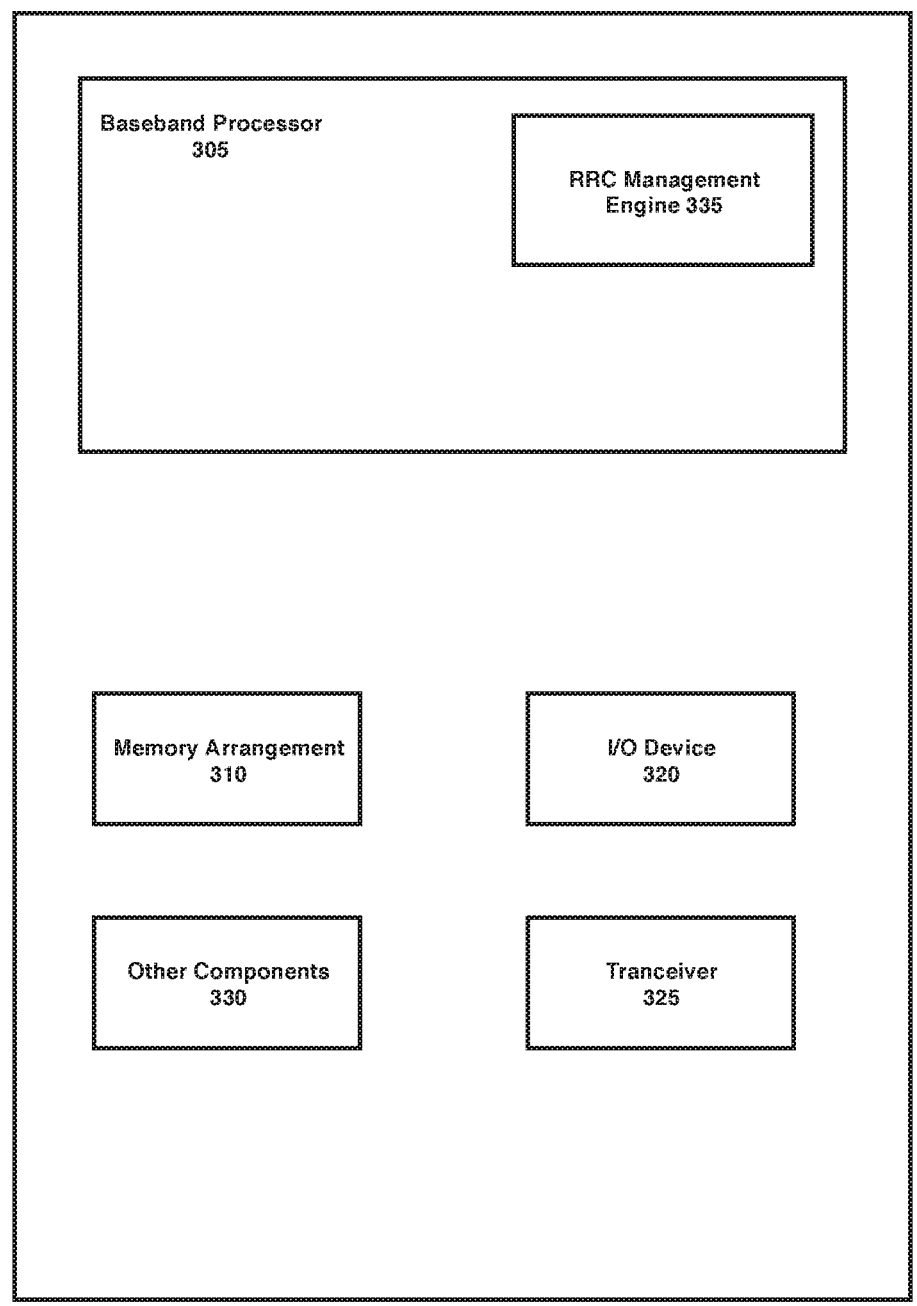
FIG. 3 shows an exemplary base station according to various exemplary embodiments.

FIG. 3 shows an exemplary network cell, in this case gNB 120A, according to various exemplary embodiments. The gNB 120A may represent any access node of the 5G NR network through which the UEs 110 may establish a connection. The gNB 120A illustrated in FIG. 3 may also represent the gNB 120B.

The gNB 120A may include a processor 305, a memory arrangement 310, an input/output (I/O) device 320, a transceiver 325, and other components 330. The other components 330 may include, for example, a power supply, a data acquisition device, ports to electrically connect the gNB 120A to other electronic devices, etc.

The processor 305 may be configured to execute a plurality of engines of the gNB 120A. For example, the engines may include an RRC management engine 335 for performing operations including configuring an RRC status of one or more SIMS of the MUSIM arrangement 240 of the UE 110. Examples of this process will be described in greater detail below.

The above noted engine being an application (e.g., a program) executed by the processor 305 is only exemplary. The functionality associated with the engines may also be represented as a separate incorporated component of the gNB 120A or may be a modular component coupled to the gNB 120A, e.g., an integrated circuit with or without firmware. For example, the integrated circuit may include input circuitry to receive signals and processing circuitry to process the signals and other information. In addition, in some gNBs, the functionality described for the processor 305 is split among a plurality of processors (e.g., a baseband processor, an applications processor, etc.). The exemplary aspects may be implemented in any of these or other configurations of a gNB.

The memory 310 may be a hardware component configured to store data related to operations performed by the UEs 110, 112. The I/O device 320 may be a hardware component or ports that enable a user to interact with the gNB 120A. The transceiver 325 may be a hardware component configured to exchange data with the UE 110 and any other UE in the system 100. The transceiver 325 may operate on a variety of different frequencies or channels (e.g., set of consecutive frequencies). Therefore, the transceiver 325 may include one or more components (e.g., radios) to enable the data exchange with the various networks and UEs.

Figure 4A:
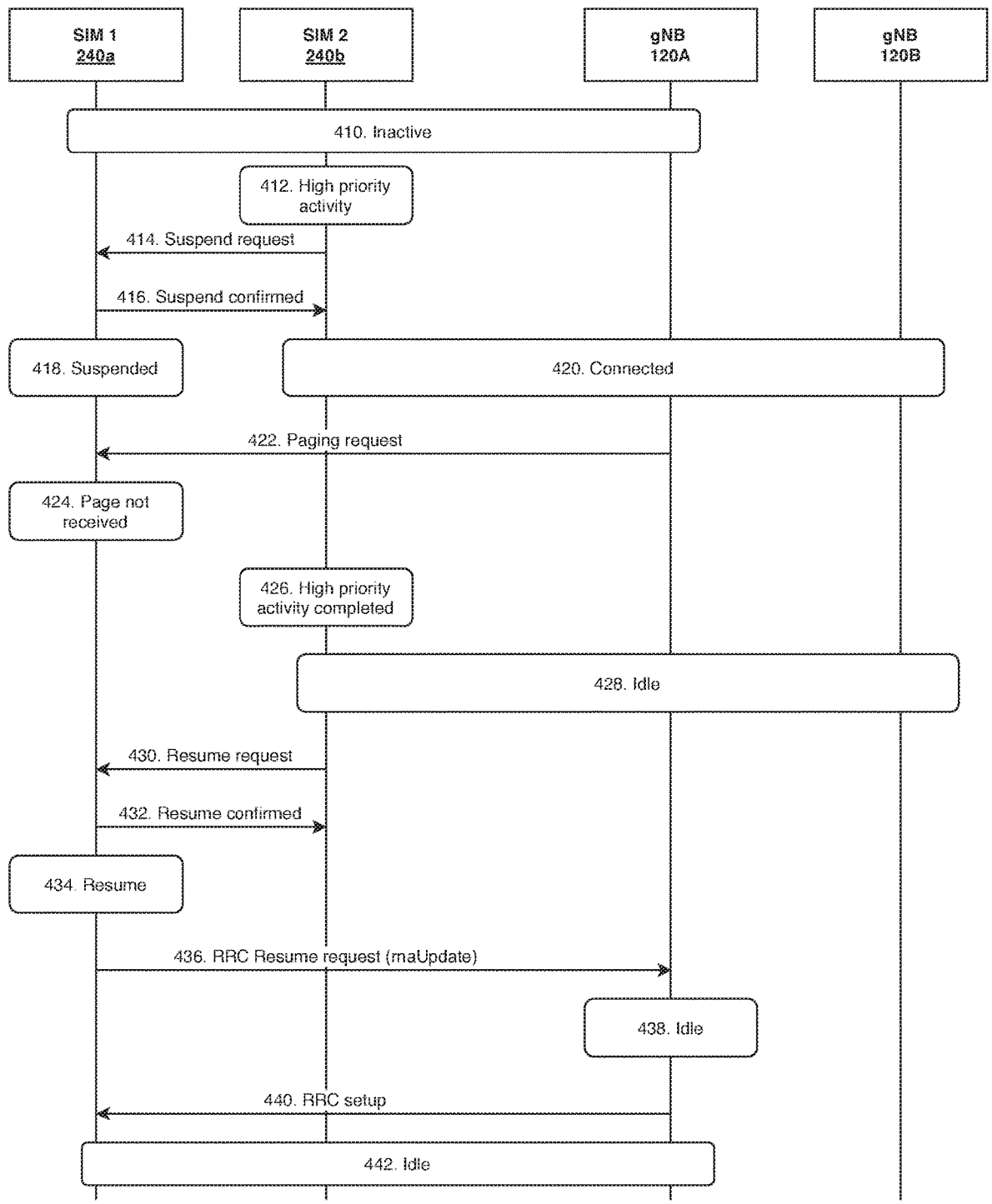
FIGS. 4a and 4b show a signaling diagram illustrating a method for synchronizing a radio resource control (RRC) status of a SIM with a base station according to various exemplary embodiments.

FIG. 4a shows a signaling diagram 400 illustrating a method for synchronizing a radio resource control (RRC) status of a SIM with a base station according to various exemplary embodiments. In the following example, it may be considered that the SIM 1 240a communicates with a first gNB 120A of a first wireless network and that the SIM 2 240b communicates with a second gNB 120B of a second wireless network. However, the exemplary embodiments are not limited to this network arrangement. For example, the SIM 1 240a or SIM 2 240b may communicate with the same network cell, the cells may be on the same network, etc.

At 410, the SIM 1 240a is in an RRC inactive state. At 412, the SIM 2 240b determines that it needs to perform a high priority activity. The high priority activity may be any wireless activity such as, for example, a video call, streaming video, etc. At 414, the SIM 2 240b requests that SIM 1 suspend its activity. In this example, because the UE 110 is a single receiver UE, the SIM 2 240b requests that the SIM 1 240a relinquish control of the transceiver 225 to the SIM 2 240b. At 416, the SIM 1 240a confirms that it has suspended its activities and the SIM 2 240b now has control of the transceiver 225. As such, at 418, SIM 1 240a is in a suspended state and at 420, SIM 2 240b is in an RRC connected state.

As described above, the RRC states define a state of a connection between the UE 110 (or corresponding SIM) and the network. There are three RRC states that the UE 110 may be in, Connected, Inactive and Idle. Thus, the suspended state 418 is not an RRC state. Rather, the suspended state 418 may be considered a local state where the UE 110 is not performing any communication functionality related to the SIM 1 240a.

While the SIM 2 240b is in the RRC Connected state 420 and is performing its high priority activity, the first gNB 120A may send periodic paging requests to the SIM 1 240a such as the paging request at 422. However, because the SIM 1 240a is in a suspended state and does not have control of the transceiver 225, the page is not received at 424. Since the first gNB 120A does not receive a response to the paging request, in some embodiments, the first gNB 120A may transition the SIM 1 240a to an RRC Idle state at the network side.

At 426, the SIM 2 240b completes its high priority activity and transitions to an RRC Idle state at 428. At 430, the SIM 2 240b requests that the SIM 1 240a resume its control of the transceiver 225. At 432, the SIM 1 240a confirms to the SIM 2 240b that the SIM 1 240a has resumed control of the transceiver 225. As such, at 434, the SIM 1 240a has resumed control of the transceiver 225. Again, the resume may be considered a local state where the SIM 1 240a may continue communications with the network because the SIM 1 240a has control of the transceiver 225.

In some embodiments, to avoid a mismatch between the SIM 1 240a and the first gNB 120A regarding the RRC status of the SIM 1 240a, at 436, the SIM 1 240a may transmit an RRC resume request with a RAN-based notification area (RNA) update (rnaUpdate) as the cause of the request (resumeCause). The rnaUpdate information element (IE) is typically sent by a UE periodically to inform the network that the UE is still functioning and connected. In some cases, the rnaUpdate IE may be triggered by the UE moving to another RNA and reporting that RNA back to the network. However, in this embodiment, the rnaUpdate IE is used by the SIM 1 240a to check its RRC status with the network (gNB 120A). Because, at 438, the first gNB 120A considers the SIM 1 240a to be in an RRC Idle state, the first gNB 120A transmits, at 440, an RRC setup command to the SIM 1 240a. Because the SIM 1 240a did not receive an RRC Release in response to the RRC resume request and instead received an RRC setup, the SIM 1 240a knows that its RRC status at the first gNB 120A is Idle. As such, at 442, SIM 1 240a enters an RRC Idle state. Thus, at the conclusion of the signaling 400, the SIM 1 240a and the first gNB 120A have the same RRC connection status.

In some exemplary embodiments, the SIM 1 240a may alternatively go through the RRC registration process in response to the RRC setup received at 440. For example, the SIM 1 240a may perform the signaling to enter the RRC Connected state with the gNB 120A and then transition to the Inactive or Idle state. Again, at the conclusion of the signaling 400, the SIM 1 240a and the first gNB 120A have the same RRC connection status.

Figure 4B:
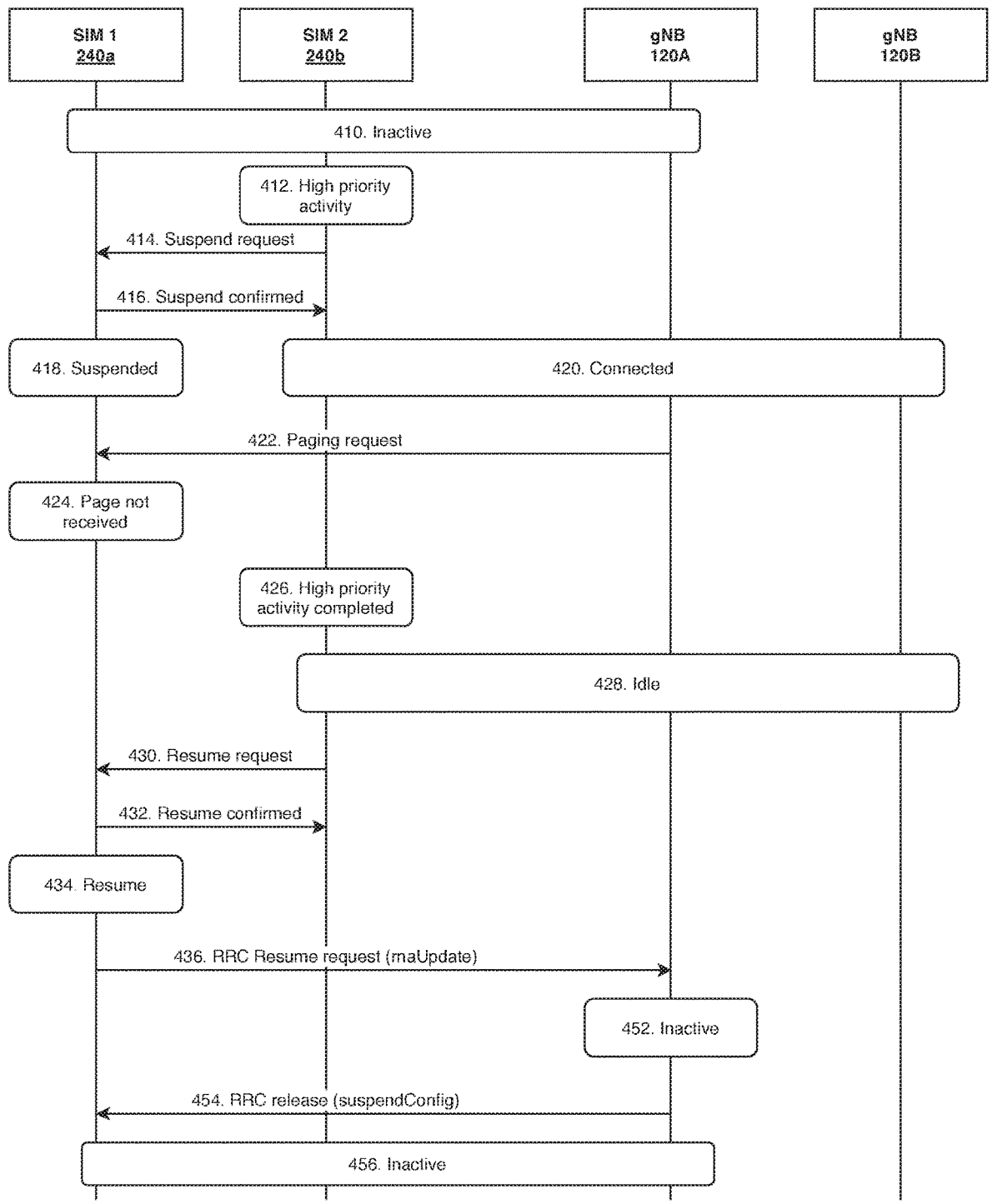

The signaling diagram 450 of FIG. 4B is substantially similar to FIG. 4A except that in this scenario, the first gNB 120A does not transition the SIM 1 240a to an RRC Idle state when it does not receive a response to the paging request at 422. Instead, the first gNB 120B allows the SIM 1 240a to remain in an RRC Inactive state on the network side. As such, at 452, the first gNB 120A considers the SIM 1 240a to be in an RRC Inactive state and, at 454, transmits an RRC release with a suspendConfig IE to SIM 1 240a. In response, at 456, the SIM 1 240a returns to the RRC Inactive state it was previously in (at 410).

Figure 5A:
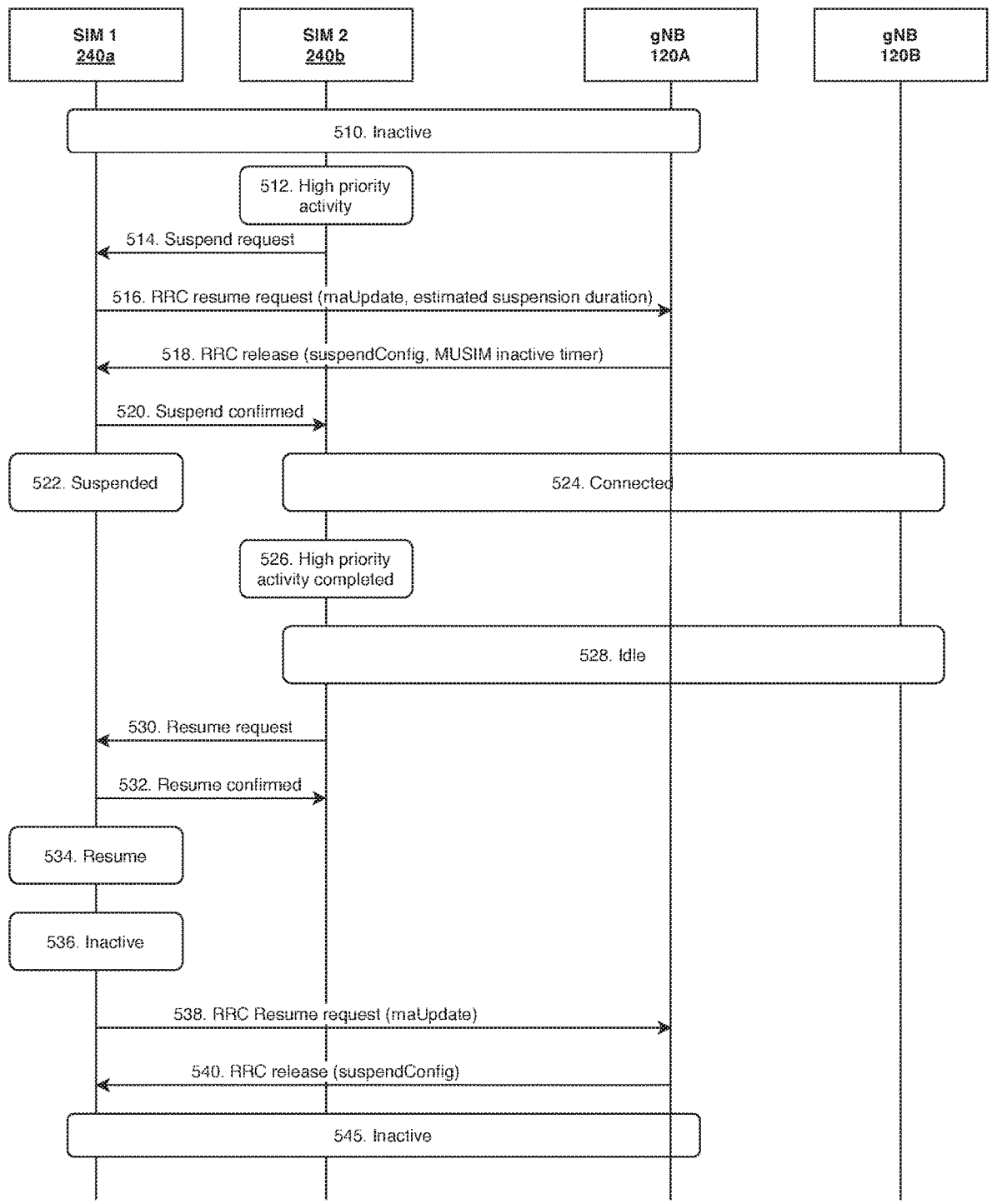
FIGS. 5a and 5b show a signaling diagram illustrating a method for synchronizing a RRC status of a SIM with a base station according to various exemplary embodiments.

FIG. 5a shows a signaling diagram 500 illustrating a method for synchronizing a RRC status of a SIM with a base station according to various exemplary embodiments. At 510, the SIM 1 240a is in an RRC inactive state. At 512, the SIM 2 240b determines that it needs to perform a high priority activity. The high priority activity may be any wireless activity such as, for example, a video call, streaming video, etc. At 514, the SIM 2 240b requests that the SIM 1 240a suspend its activity. Based on the specific activity the SIM 2 240b will be conducting, the SIM 1 240a determines an estimated time period (estimated suspension duration) during which the SIM 1 240a will remain in a suspended state. The time period may be determined by the SIM 1 240a in a variety of manners. For example, the SIM 1 240*a* may receive an indication from the SIM 2 240*b* in the request for the transceiver (at 514) that may be used for the SIM 1 240*a* to determine the time period. The indication may be a direct indication of the amount of time SIM 2 240*b* estimates it will be using the transceiver, an indirect indication such as an indication of the application that will be used by the SIM 2 240*b* based on which the SIM 1 240*a* may then estimate the time period, or any other indication that the SIM 1 240*a* may use to estimate the time period. At 516, the SIM 1 240*a* transmits an RRC resume request with an rnaUpdate IE and an estimated suspension duration IE to report this estimate to the first gNB 120A.

In response, at 518, the first gNB 120A transmits an RRC release command with a suspendConfig IE and a MUSIM inactive timer IE. The MUSIM inactive timer IE indicates the time duration for which the first gNB 120A will keep the SIM 1 240*a* in an RRC Inactive state. As a result, the SIM 1 240*a* is aware of the time period after which the first gNB 120A will transition the SIM 1 240*a* to an RRC Idle state. Although the first gNB 120A determines the MUSIM inactive timer based on the estimated suspension duration provided by the SIM 1 240*a*, the two time periods do not need to be equivalent. For example, in some embodiments, the MUSIM inactive timer may have time duration equal to the estimated suspension duration. Alternatively, in some embodiments, the MUSIM inactive timer may have a time duration that is less than the estimated suspension duration. In some embodiments, the MUSIM inactive timer may have a time duration that is greater than the estimated suspension duration. The MUSIM inactive timer depends on the capabilities of the first gNB 120A. In some embodiments, the SIM 1 240*a* may alternatively report the estimated suspension duration to the first gNB 120A by first resuming the RRC connection (using the RRC resume request with resumeCause as highPriorityAccess or mo-signaling) to switch to an RRC Connected state and then using UE Assistance Info to communicate the estimated suspension duration (as will be discussed further with respect to FIG. 7 below).

At 520, the SIM 1 240*a* confirms that it has suspended its activities and the SIM 2 240*b* now has control of the transceiver 225. As such, at 522, the SIM 1 240*a* is in a suspended state and at 524, the SIM 2 240*b* is in an RRC connected state. At 526, the SIM 2 240*b* completes its high priority activity. Subsequently, at 528, the SIM 2 240*b* enters an RRC Idle state. At 530, the SIM 2 240*b* requests that the SIM 1 240*a* resume its control of the transceiver 225. At 532, the SIM 1 240*a* confirms to the SIM 2 240*b* that the SIM 1 240*a* has resumed control of the transceiver 225. As such, at 534, the SIM 1 240*a* has resumed control of the transceiver 225. FIG. 4A assumes that the SIM 1 240*a* resumes control of the transceiver at 534 before expiration of the MUSIM inactive timer. As such, at 536, SIM 1 returns to the RRC inactive state because it knows that it resumed control of the transceiver prior to the expiration of the MUSIM inactive timer. At 538, the SIM 1 240*a* transmits an RRC resume request with a rnaUpdate IE to the first gNB 120A. At 540, the first gNB 120A transmits an RRC release with a suspendConfig IE to the SIM 1 240*a*. As a result, at 545, SIM 1 240*a* and the first gNB 120A both consider the SIM 1 240*a* to be in an RRC Inactive state.

Figure 5B:
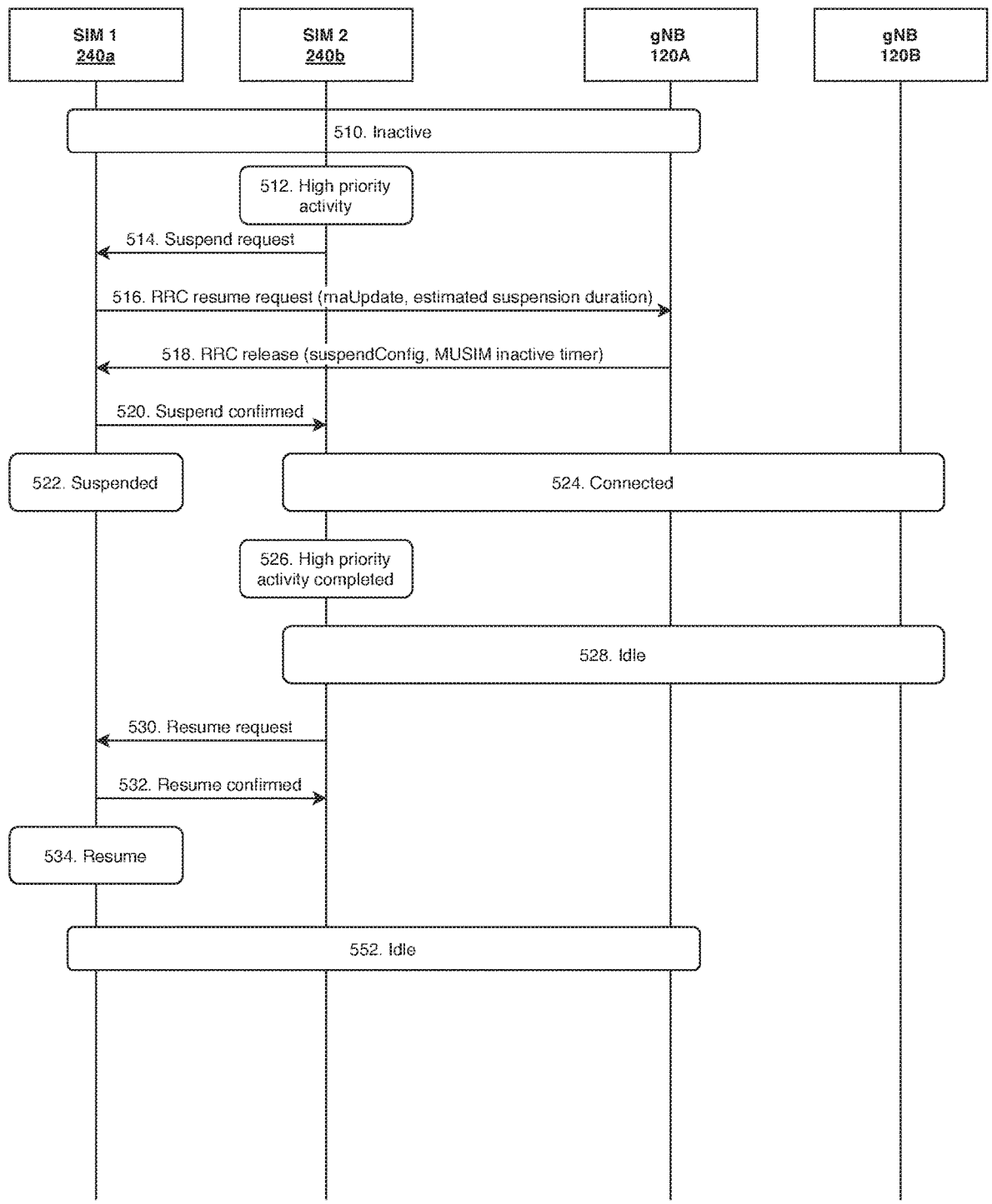

The signaling diagram 550 of FIG. 5B is substantially similar to FIG. 5A except that in this scenario, the SIM 1 240*a* does not resume control of the transceiver 225 at 534 before expiration of the MUSIM inactive timer. As a result, the SIM 1 240*a* knows that it should enter an RRC Idle state because the first gNB 120A has transitioned the SIM 1 240*a* to the RRC Idle state at the expiration of the MUSIM inactive timer. So, at 552, the SIM 1 240*a* enters the RRC Idle state.

Figure 6:
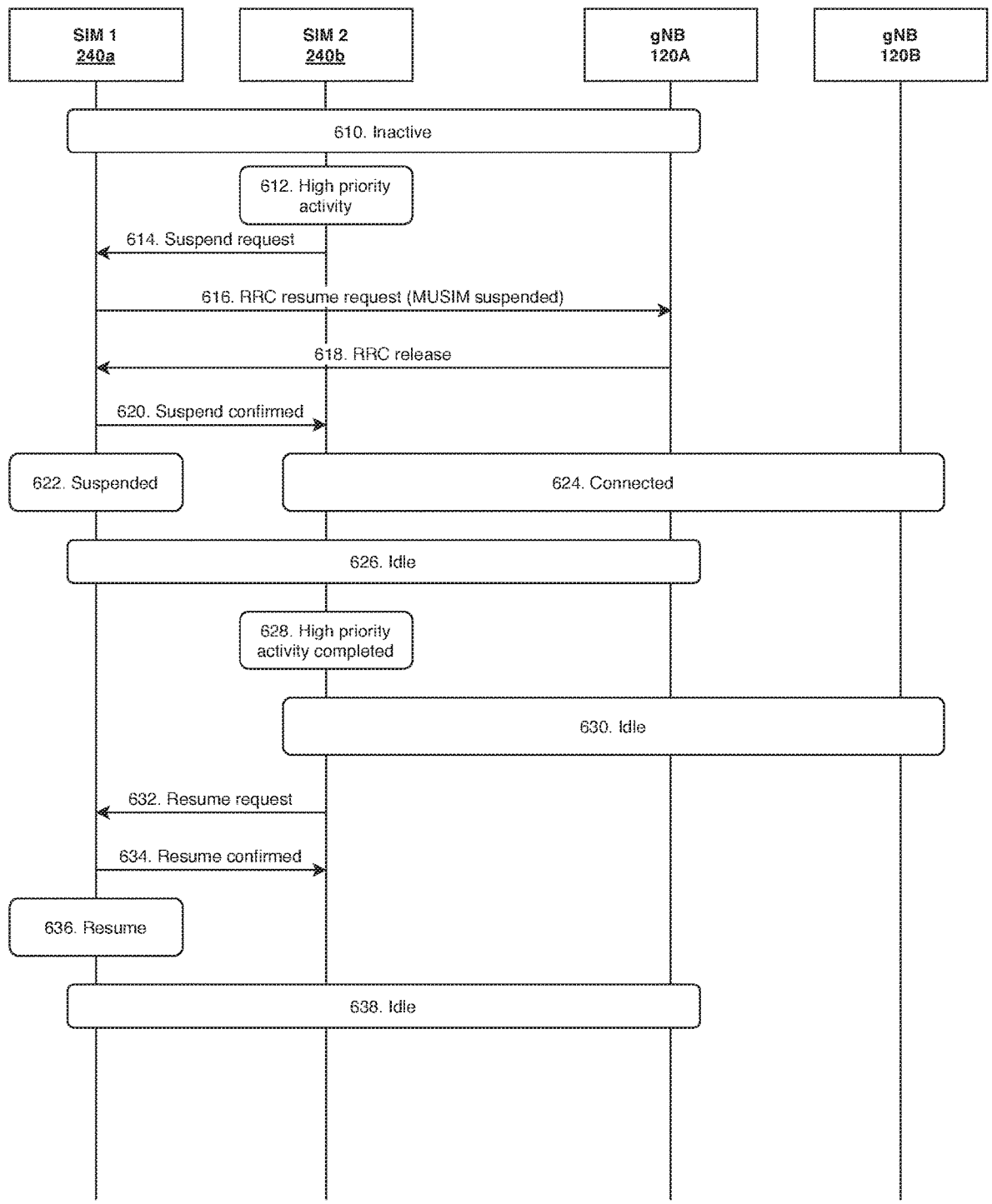
FIG. 6 shows a signaling diagram illustrating a method for synchronizing a RRC status of a SIM with a base station according to various exemplary embodiments.

FIG. 6 shows a signaling diagram 600 illustrating a method for synchronizing a RRC status of a SIM with a base station according to various exemplary embodiments. In FIG. 6, it is assumed that the SIM 1 240*a* has previously been made aware (e.g., via a system information block (SIB) or other indication from the network) that the network supports coordinated leaving, in which the network and a UE can voluntarily transition an RRC connection to an RRC Inactive state or RRC Idle state.

At 610, the SIM 1 240*a* is in an RRC inactive state. At 612, the SIM 2 240*b* determines that it needs to perform a high priority activity. The high priority activity may be any wireless activity such as, for example, a video call, streaming video, etc. At 614, the SIM 2 240*b* requests that SIM 1 suspend its activity. At 616, the SIM 1 240*a* transmits an RRC resume request with a resumeCause of "MUSIM suspended" to initiate coordinated leaving and inform the first gNB 120A that the SIM 1 240*a* will be in a suspended state. However, in the scenario illustrated in FIG. 6, the first gNB 120A is temporarily unable to support coordinated leaving and, therefore, transmits an RRC release at 618, which indicates to the SIM 1 240*a* that the first gNB 120A has transitioned it to an RRC Idle state.

At 620, the SIM 1 240*a* confirms that it has suspended its activities and that the SIM 2 240*b* now has control of the transceiver 225. As such, at 622, the SIM 1 240*a* is in a suspended state and at 624, the SIM 2 240*b* is in an RRC connected state. At 626, both the SIM 1 240*a* and the first gNB 120A consider the SIM 1 240*a* to be in an RRC Idle state. At 628, the SIM 2 240*b* completes its high priority activity. Subsequently, at 630, the SIM 2 240*b* enters an RRC Idle state. At 632, the SIM 2 240*b* requests that the SIM 1 240*a* resume its control of the transceiver 225. At 634, the SIM 1 240*a* confirms to the SIM 2 240*b* that the SIM 1 240*a* has resumed control of the transceiver 225. As such, at 636, the SIM 1 240*a* has resumed control of the transceiver 225. At 638, the SIM 1 240*a* returns to the RRC Idle state as instructed by the first gNB 120A at 618.

Figure 7:
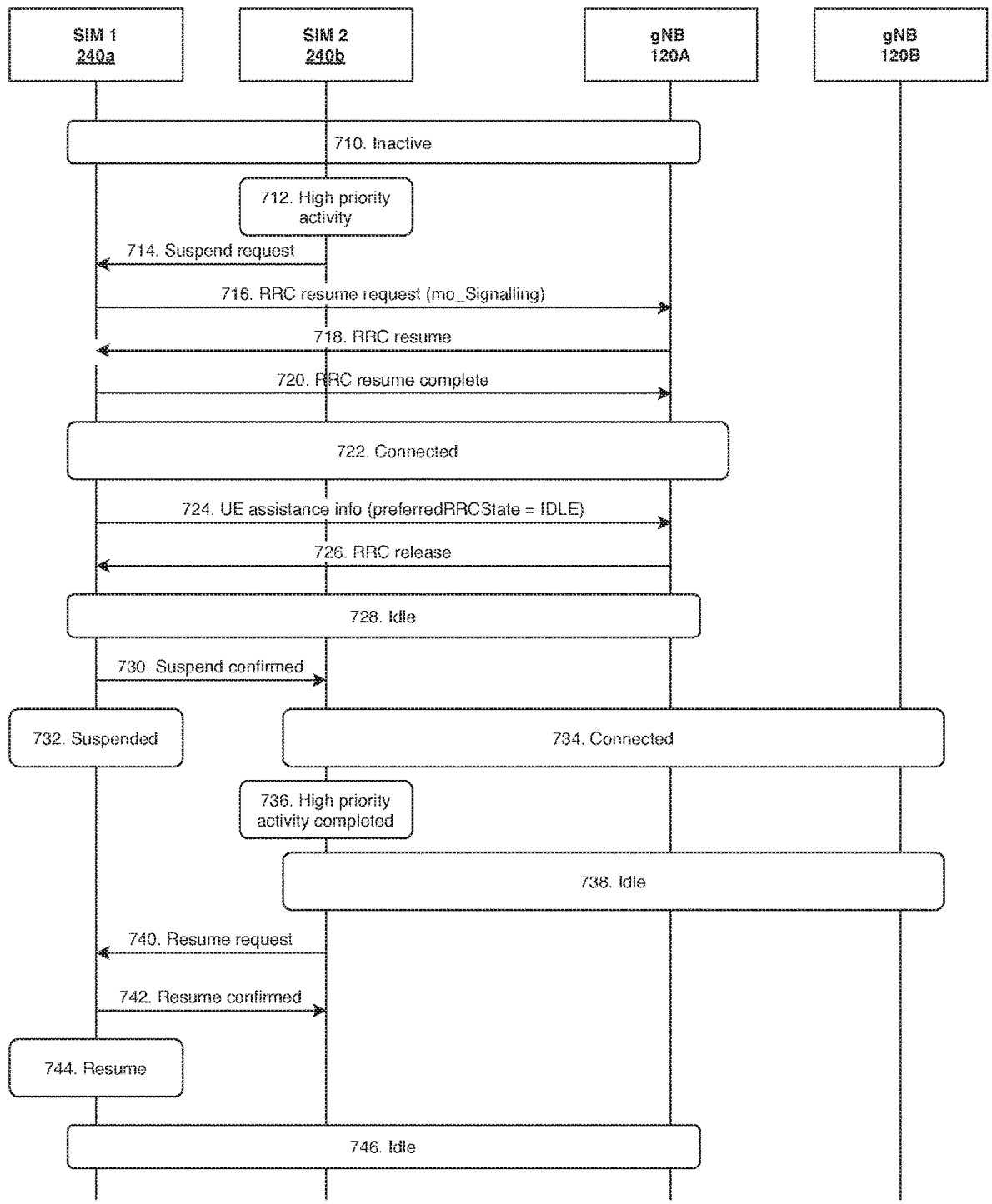
FIG. 7 shows a signaling diagram illustrating a method for synchronizing a RRC status of a SIM with a base station according to various exemplary embodiments.

FIG. 7 shows a signaling diagram 700 illustrating a method for synchronizing a RRC status of a SIM with a base station according to various exemplary embodiments. At 710, the SIM 1 240*a* is in an RRC inactive state. At 712, the SIM 2 240*b* determines that it needs to perform a high priority activity. The high priority activity may be any wireless activity such as, for example, a video call, streaming video, etc. At 714, the SIM 2 240*b* requests that the SIM 1 240*a* suspend its activity. At 716, the SIM 1 240*a* transmits an RRC resume request with a resumeCause of mobile originated (MO)-originated signaling (mo_Signaling) to request that the first gNB 120A transition the SIM 1 240*a* to an RRC connected state. At 718, the first gNB 120A transmits an RRC resume command to the SIM 1 240*a*. In response, at 720, the SIM 1 240*a* transmits an RRC resume complete to the first gNB 120A. As such, at 722, the SIM 1 240*a* is in an RRC connected state. While in the connected state, the SIM 1 240*a* transmits, at 724, UE assistance info with the preferredRRCState IE set to Idle to indicate to the first gNB 120A that the SIM 1 240*a* wishes to be transitioned to an RRC Idle state. In response, the first gNB 120A transmits an RRC release command to the SIM 1 240*a*, which transitions it to the RRC Idle state as requested. As such, at 728, the SIM 1 240*a* is in an RRC Idle state.

At 730, the SIM 1 240a confirms that it has suspended its activities and that the SIM 2 240b now has control of the transceiver 225. As such, at 732, the SIM 1 240a is in a suspended state and at 734, the SIM 2 240b is in an RRC connected state. At 736, the SIM 2 240b completes its high priority activity. Subsequently, at 738, the SIM 2 240b enters an RRC Idle state. At 740, the SIM 2 240b requests that the SIM 1 240a resume its control of the transceiver 225. At 742, the SIM 1 240a confirms to the SIM 2 240b that the SIM 1 240a has resumed control of the transceiver 225. As such, at 744, the SIM 1 240a has resumed control of the transceiver 225. At 746, the SIM 1 240a returns to the RRC Idle state as instructed by the first gNB 120A at 726.

Figure 8A:
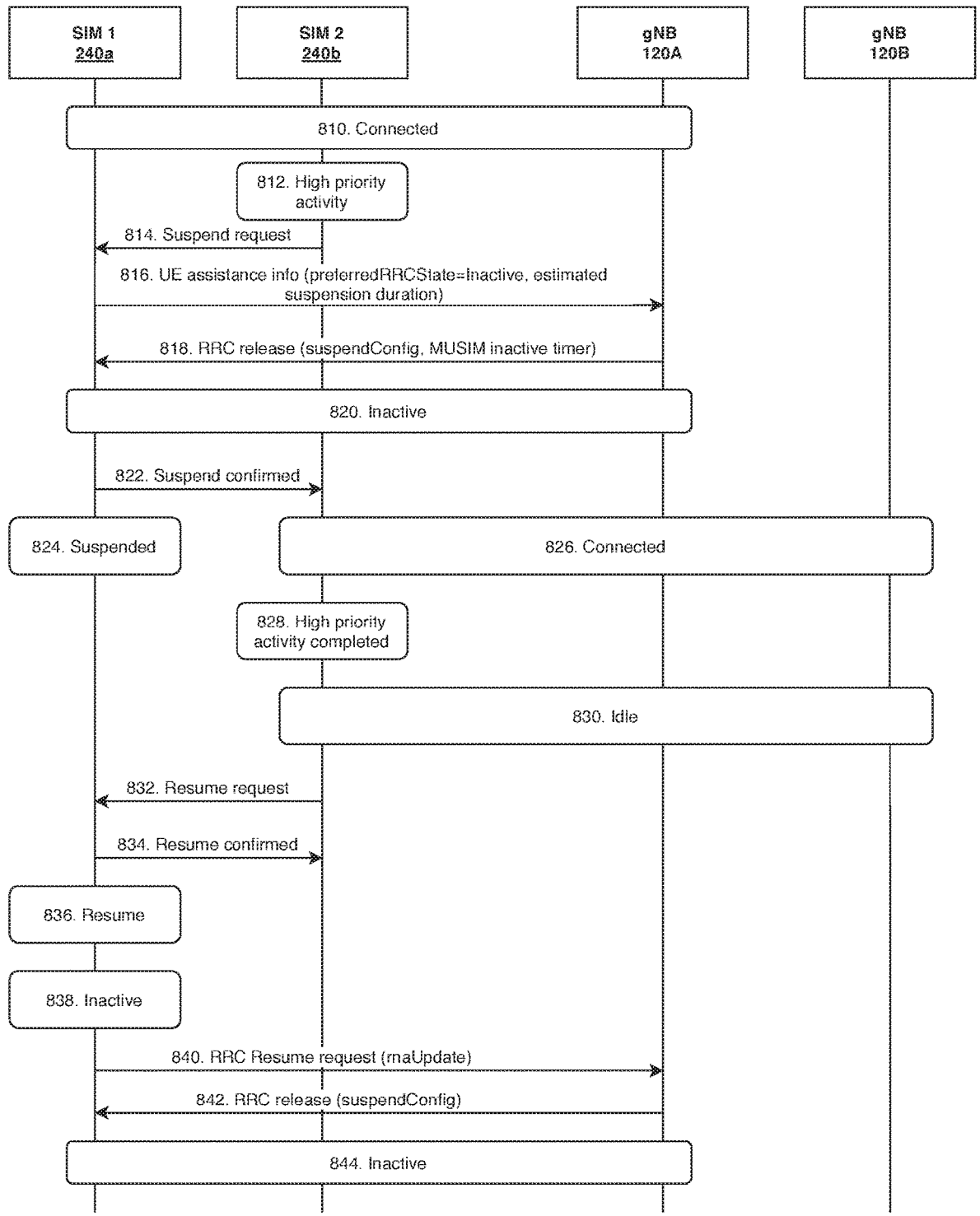
FIGS. 8a and 8b show a signaling diagram illustrating a method for synchronizing a RRC status of a SIM with a base station according to various exemplary embodiments.

FIG. 8a shows a signaling diagram illustrating a method for synchronizing a RRC status of a SIM with a base station according to various exemplary embodiments. At 810, the SIM 1 240a is in an RRC Connected state. At 812, the SIM 2 240b determines that it needs to perform a high priority activity. The high priority activity may be any wireless activity such as, for example, a video call, streaming video, etc. At 814, the SIM 2 240b requests that the SIM 1 240a suspend its activity. At 816, the SIM 1 240a transmits an RRC resume request with (1) the preferredRRCState IE set to Inactive to indicate that the SIM 1 240a wishes to be transitioned to an RRC Inactive state and (2) an estimated suspension duration IE to report the estimated time duration during which the SIM 1 240a will be in a suspended state to the first gNB 120A.

In response, at 818, the first gNB 120A transmits an RRC release command with a suspendConfig IE and a MUSIM inactive timer IE. As explained above with respect to FIG. 5A, although the first gNB 120A determines the MUSIM inactive timer based on the estimated suspension duration provided by the SIM 1 240a, the two time periods do not need to be equivalent. Instead, the time period indicated by the MUSIM inactive timer may instead be greater than or less than the estimated suspension duration. As a result, at 820, the SIM 1 240a is transitioned to an RRC Inactive state.

At 822, the SIM 1 240a confirms that it has suspended its activities and the SIM 2 240b now has control of the transceiver 225. As such, at 824, the SIM 1 240a is in a suspended state and at 826, the SIM 2 240b is in an RRC connected state. At 828, the SIM 2 240b completes its high priority activity. Subsequently, at 830, the SIM 2 240b enters an RRC Idle state. At 832, the SIM 2 240b requests that the SIM 1 240a resume its control of the transceiver 225. At 834, the SIM 1 240a confirms to SIM 2 240b that the SIM 1 240a has resumed control of the transceiver 225. As such, at 836, the SIM 1 240a has resumed control of the transceiver 225. In the signaling 800 of FIG. 8A, it may be considered that the SIM 1 240a resumes control of the transceiver at 836 before expiration of the MUSIM inactive timer. As such, at 838, the SIM 1 240a returns to the RRC inactive state because it knows that it resumed control of the transceiver prior to the expiration of the MUSIM inactive timer. At 840, the SIM 1 240a transmits an RRC resume request with a rnaUpdate IE to the first gNB 120A. At 842, the first gNB 120A transmits an RRC release with a suspendConfig IE to the SIM 1 240a. As a result, at 844, the SIM 1 240a and the first gNB 120A both consider SIM 1 240a to be in an RRC Inactive state.

Figure 8B:
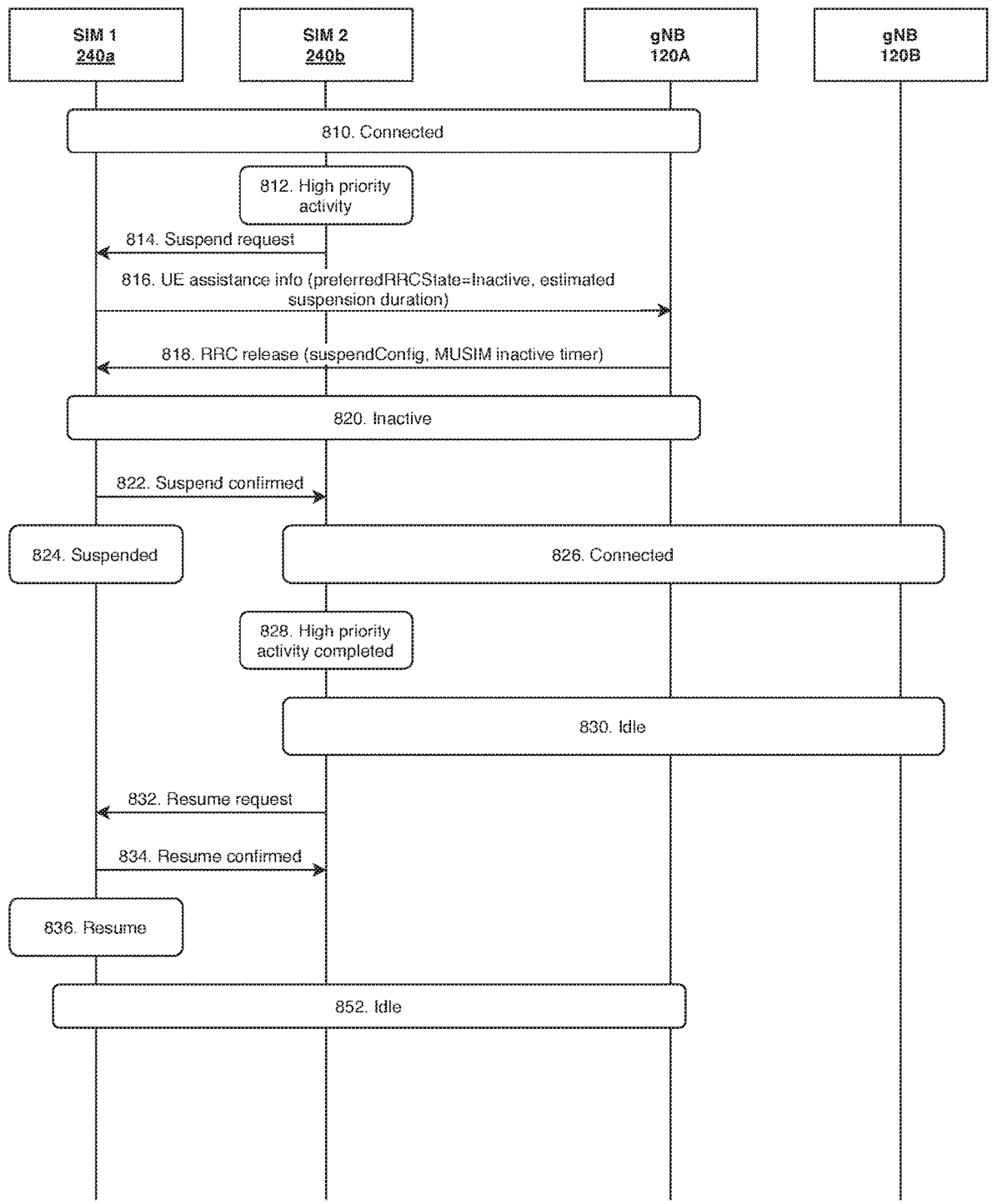

The signaling 850 of FIG. 8B is substantially similar to FIG. 8A except that in this scenario, the SIM 1 240a does not resume control of the transceiver 225 at 836 before expiration of the MUSIM inactive timer. As a result, the SIM 1 240a knows that it should enter an RRC Idle state because the first gNB 120A has transitioned the SIM 1 240a to the RRC Idle state at the expiration of the MUSIM inactive timer. So, at 852, the SIM 1 240a enters RRC Idle state.

As noted above, an RNA update may be periodically transmitted to the gNB. In some embodiments, the UE 110 may indicate to the network that it is a MUSIM UE (e.g., in a UE capability transmission, during registration, etc.). As a result, the network (gNB 120A or gNB 120B) may configure a greater RNA update timer for the UE 110. That is, the time duration between each periodic RNA update is increased by the gNB 120A based on the indication that the UE 110 is a MUSIM UE. As a result, when the SIM 2 240b is performing its high priority activity and the SIM 1 240a is in a suspended state, the first gNB 120A will keep the SIM 1 240a in an RRC Inactive state for a longer period of time. This period of time is configured such that the SIM 1 240a is not required to transmit an RNA update while it is in a suspended state. As a result, the first gNB 120A does not expect an RNA Update from the SIM 1 240a and retains the SIM 1 240a in an RRC Inactive state.

As also noted above, the SIM 1 240a may be made aware that the network supports coordinated leaving. For example, in some embodiments, a new SIB indicating MUSIM system information may be utilized. For example, a new SIB15 may be scheduled by a SIB1 and broadcast by the first gNB 120A to indicate to UEs that the first gNB 120A supports coordinated leaving. This new capability may be transmitted by the gNB as part of the network's capability in a registration acceptance procedure when a UE performs a registration procedure. In some embodiments, supported timer values may additionally be indicated in the network's capability. As a result, a MUSIM UE is made aware of how long the network will support suspension of a SIM before transitioning it to an RRC Idle state.

EXAMPLES

In a first example a user equipment (UE) comprises a multi universal subscriber identity module (MUSIM) array having a first SIM and a second SIM, a transceiver configured to communicate with one or more networks and a processor communicatively coupled to the transceiver and the MUSIM and configured to perform operations comprising, registering to a first network for the first SIM, registering to a second network for the second SIM, prior to the UE conducting a high priority activity related to the second SIM, sending, to the first network via a connection associated with the first SIM, a first message comprising an estimated time duration during which the UE is to conduct the high priority activity related to the second SIM, receiving, from the first network, a second message indicating a time period during which the first network will retain a connection context for the connection associated with the first SIM in an RRC Inactive state, and when the UE completes the high priority activity related to the second SIM, determining the connection context of the first network for the connection associated with the first SIM.

In a second example, the UE of the first example, wherein, when the UE completes the high priority activity related to the second SIM before expiration of the time period, the connection context of the first network for the connection associated with the first SIM is an RRC Inactive state, and wherein, when the UE completes the high priority activity related to the second SIM after expiration of the time period, the connection context of the first network for the connection associated with the first SIM is an RRC Idle state.

In a third example, the UE of the second example, wherein, prior to the UE conducting the high priority activity related to the second SIM, the connection associated with the first SIM is in the RRC Inactive state.

In a fourth example, the UE of the third example, wherein the first message comprises an RRC resume request including a radio access network (RAN)-based notification area (RNA) update and the estimated time duration.

In a fifth example, the UE of the second example, wherein, prior to the UE conducting the high priority activity related to the second SIM, the connection associated with the first SIM is in an RRC Connected state.

In a sixth example, the UE of the fifth example, wherein the first message comprises a UE assistance information message including the estimated time duration and a preferred RRC state set to Inactive.

In a seventh example, the UE of the first example, wherein the second message comprises a radio resource control (RRC) configuration message.

In an eight example, a processor is communicatively coupled to a multi universal subscriber identity module (MUSIM) array having a first SIM and a second SIM of a user equipment (UE), and the processor configured to perform operations comprising, registering to a first network for the first SIM, registering to a second network for the second SIM, prior to the UE conducting a high priority activity related to the second SIM, sending, to the first network via a connection associated with the first SIM, a first message comprising an estimated time duration during which the UE is to conduct the high priority activity related to the second SIM, receiving, from the first network, a second message indicating a time period during which the first network will retain a connection context for the connection associated with the first SIM in an RRC Inactive state and, when the UE completes the high priority activity related to the second SIM, determining a connection context of the first network for the connection associated with the first SIM.

In a ninth example, the processor of the eighth example, wherein, when the UE completes the high priority activity related to the second SIM before expiration of the time period, the connection context of the first network for the connection associated with the first SIM is an RRC Inactive state, and wherein, when the UE completes the high priority activity related to the second SIM after expiration of the time period, the connection context of the first network for the connection associated with the first SIM is an RRC Idle state.

In a tenth example, the processor of the ninth example, wherein, prior to the UE conducting the high priority activity related to the second SIM, the connection associated with the first SIM is in the RRC Inactive state.

In an eleventh example, the processor of the tenth example, wherein the first message comprises an RRC resume request including a radio access network (RAN)-based notification area (RNA) update and the estimated time duration.

In a twelfth example, the processor of the ninth example, wherein, prior to the UE conducting the high priority activity related to the second SIM, the connection associated with the first SIM is in an RRC Connected state.

In a thirteenth example, the processor of the twelfth example, wherein the first message comprises a UE assistance information message including the estimated time duration and a preferred RRC state set to inactive.

In a fourteenth example, the processor of the eighth example, wherein the second message comprises a radio resource control (RRC) configuration message.

In a fifteenth example, a user equipment (UE) comprises a multi universal subscriber identity module (MUSIM) array having a first SIM and a second SIM, a transceiver configured to communicate with one or more networks and a processor communicatively coupled to the transceiver and the MUSIM and configured to perform operations comprising, registering to a first network for the first SIM, registering to a second network for the second SIM, performing, by the UE, a high priority activity via a connection associated with the second SIM, wherein, a connection associated with the first SIM is in a suspended state while the high priority activity is being performed via the connection associated with the second SIM, when the UE completes the high priority activity related to the second SIM, transmitting, to the first network via the connection associated with the first SIM, an RRC resume request including a cause value indicating rnaUpdate.

In a sixteenth example, the UE of the fifteenth example, wherein, prior to the UE conducting the high priority activity related to the second SIM, the connection associated with the first SIM is in the RRC Inactive state.

In a seventeenth example, the UE of the sixteenth example, wherein the operations further comprise receiving, from the first network via the connection associated with the first SIM, an RRC setup message when the first network has transitioned a connection context of the connection associated with the first SIM to an RRC Idle state and transitioning the connection associated with the first SIM to the RRC Idle state.

In an eighteenth example, the UE of the sixteenth example, wherein the operations further comprise receiving, from the first network via the connection associated with the first SIM, an RRC release message including a suspendConfig information element (IE) when the first network has retained a connection context of the connection associated with the first SIM in the RRC Inactive state.

In a nineteenth example, a user equipment (UE) comprises a multi universal subscriber identity module (MUSIM) array having a first SIM and a second SIM, a transceiver configured to connect to one or more networks and a processor communicatively coupled to the transceiver and the MUSIM and configured to perform operations comprising registering to a first network for the first SIM, registering to a second network for the second SIM and prior to the UE conducting a high priority activity related to the second SIM, transmitting, to the first network via a connection associated with the first SIM, an RRC resume request comprising an indication that the UE is requesting initiation of coordinated leaving related to the connection associated with the first SIM.

In a twentieth example, the UE of the nineteenth example, wherein, prior to the UE conducting the high priority activity related to the second SIM, the connection associated with the first SIM is in the RRC Inactive state.

In a twenty first example, the UE of the twentieth example, wherein the operations further comprise receiving, from the first network via the connection associated with the first SIM, an RRC release indicating the connection associated with the first SIM is to transition to an RRC Idle state when the first network does not support coordinated leaving.

In a twenty second example, a user equipment (UE) comprises a multi universal subscriber identity module (MUSIM) array having a first SIM and a second SIM, a transceiver configured to communicate with one or base stations and a processor communicatively coupled to the transceiver and the MUSIM and configured to perform operations comprising registering to a first network for the first SIM, registering to a second network for the second SIM, transmitting, to the first network via a connection associated with the first SIM, an RRC resume request comprising a mobile-originated signaling IE indicating that a connection context for the connection associated with the first SIM should be transitioned to an RRC connected state, receiving, from the first network via the connection associated with the first SIM, an RRC resume message indicating that the connection associated with the first SIM should transition to the RRC connected state, transitioning the connection associated with the first SIM to the RRC connected state, transmitting, to the first network via the connection associated with the first SIM, a UE assistance information message comprising a preferred RRC state set to idle, receiving, from the first network via the connection associated with the first SIM, an RRC release message, transitioning the connection associated with the first SIM to an RRC Idle state, performing a high priority activity via a connection associated with the second SIM.

In a twenty third example, the UE of the twenty second example, wherein, prior to transmitting the RRC resume request, the connection associated with the first SIM is in an RRC Inactive state.

In a twenty fourth example, a base station comprises a transceiver configured to communicate with a user equipment (UE) having a multi universal subscriber identity module (MUSIM) array with a first SIM and a second SIM and a processor communicatively coupled to the transceiver and configured to perform operations comprising receiving a first message from the UE indicating an estimated time duration during which a connection associated with the first SIM will be in a suspended state and transmitting, to the UE via the connection associated with the first SIM, a second message indicating a time period during which the base station will retain a connection context for the connection associated with the first SIM in an RRC Inactive state.

In a twenty fifth example, the base station of the twenty fourth example, wherein the operations further comprise one of (a) transitioning the connection context for the connection associated with the first SIM to an RRC Idle state if the connection associated with the first SIM is transitioned out of the suspended state after expiration of the time period transmitted to the UE or (b) retaining the connection context for the connection associated with the first SIM in the RRC Inactive state if the connection associated with the first SIM is transitioned out of the suspended state before expiration of the time period transmitted to the UE.

In a twenty sixth example, the base station of the twenty fifth example, wherein, prior to receiving the first message, the connection associated with the first SIM is in the RRC Inactive state.

In a twenty seventh example, the base station of the twenty sixth example, wherein the first message comprises an RRC resume request including a radio access network (RAN)-based notification area (RNA) update and the estimated time duration.

In a twenty eighth example, the base station of the twenty fifth example, wherein, prior to receiving the first message, the connection associated with the first SIM is in an RRC Connected state.

In a twenty ninth example, the base station of the twenty eighth example, wherein the first message comprises a UE assistance information message including the estimated time duration and a preferred RRC state set to Inactive.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

Although this application described various aspects each having different features in various combinations, those skilled in the art will understand that any of the features of one aspect may be combined with the features of the other aspects in any manner not specifically disclaimed or which is not functionally or logically inconsistent with the operation of the device or the stated functions of the disclosed aspects.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A user equipment (UE), comprising:
a multi universal subscriber identity module (MUSIM) array having a first SIM and a second SIM;
a transceiver configured to communicate with one or more networks; and
a processor communicatively coupled to the transceiver and the MUSIM and configured to perform operations comprising:
registering to a first network for the first SIM;
registering to a second network for the second SIM;
prior to the UE conducting a high priority activity related to the second SIM, sending, to the first network via a connection associated with the first SIM, a first message related to the second SIM, wherein the first message comprises a UE assistance information message including a preferred RRC state set to Inactive;
receiving, from the first network, a second message indicating that the first network will retain a connection context for the connection associated with the first SIM in an RRC Inactive state; and
determining the connection context of the first network for the connection associated with the first SIM.

2. The UE of claim 1, wherein, when the UE completes the high priority activity related to the second SIM before expiration of a time period, the connection context of the first network for the connection associated with the first SIM is an RRC Inactive state, and wherein, when the UE completes the high priority activity related to the second SIM after expiration of the time period, the connection context of the first network for the connection associated with the first SIM is an RRC Idle state.

3. The UE of claim 2, wherein, prior to the UE conducting the high priority activity related to the second SIM, the connection associated with the first SIM is in the RRC Inactive state.

4. The UE of claim 3, wherein the first message comprises an RRC resume request including a radio access network (RAN)-based notification area (RNA) update.

5. The UE of claim 2, wherein, prior to the UE conducting the high priority activity related to the second SIM, the connection associated with the first SIM is in an RRC Connected state.

6. The method of claim 2, wherein, prior to the UE conducting the high priority activity related to the second SIM, the connection associated with the first SIM is in the RRC Inactive state.

7. The method of claim 3, wherein the first message comprises an RRC resume request including a radio access network (RAN)-based notification area (RNA) update.

8. The method of claim 2, wherein, prior to the UE conducting the high priority activity related to the second SIM, the connection associated with the first SIM is in an RRC Connected state.

9. The UE of claim 1, wherein the second message comprises a radio resource control (RRC) configuration message.

10. A processor communicatively coupled to a multi universal subscriber identity module (MUSIM) array having a first SIM and a second SIM of a user equipment (UE), the processor configured to perform operations comprising:
registering to a first network for the first SIM;
registering to a second network for the second SIM;
prior to the UE conducting a high priority activity related to the second SIM, sending, to the first network via a connection associated with the first SIM, a first message related to the second SIM, wherein the first message comprises a UE assistance information message including a preferred RRC state set to Inactive;
receiving, from the first network, a second message indicating that the-first network will retain a connection context for the connection associated with the first SIM in an RRC Inactive state; and
determining a connection context of the first network for the connection associated with the first SIM.

11. The processor of claim 10, wherein, when the UE completes the high priority activity related to the second SIM before expiration of a time period, the connection context of the first network for the connection associated with the first SIM is an RRC Inactive state, and wherein, when the UE completes the high priority activity related to the second SIM after expiration of the time period, the connection context of the first network for the connection associated with the first SIM is an RRC Idle state.

12. The processor of claim 11, wherein, prior to the UE conducting the high priority activity related to the second SIM, the connection associated with the first SIM is in the RRC Inactive state.

13. The processor of claim 12, wherein the first message comprises an RRC resume request including a radio access network (RAN)-based notification area (RNA) update.

14. The processor of claim 11, wherein, prior to the UE conducting the high priority activity related to the second SIM, the connection associated with the first SIM is in an RRC Connected state.

15. The processor of claim 10, wherein the second message comprises a radio resource control (RRC) configuration message.

16. A method, comprising:
at a user equipment (UE) configured with a multi universal subscriber identity module (MUSIM) array having a first SIM and a second SIM:
registering to a first network for the first SIM;
registering to a second network for the second SIM;
prior to the UE conducting a high priority activity related to the second SIM, sending, to the first network via a connection associated with the first SIM, a first message related to the second SIM, wherein the first message comprises a UE assistance information message including a preferred RRC state set to Inactive;
receiving, from the first network, a second message indicating that the first network will retain a connection context for the connection associated with the first SIM in an RRC Inactive state; and
determining the connection context of the first network for the connection associated with the first SIM.

17. The method of claim 16, wherein, when the UE completes the high priority activity related to the second SIM before expiration of a time period, the connection context of the first network for the connection associated with the first SIM is an RRC Inactive state, and wherein, when the UE completes the high priority activity related to the second SIM after expiration of the time period, the connection context of the first network for the connection associated with the first SIM is an RRC Idle state.

* * * * *